[11] 3,578,082

[72] Inventors John A. Davis Jr.;
William J. Kunzman, Littleton, Colo.
[21] Appl. No. 870,244
[22] Filed Nov. 6, 1969
[45] Patented May 11, 1971
[73] Assignee Marathon Oil Company
Findlay, Ohio
Continuation-in-part of application Ser. No.
746,391, July 22, 1968, now Patent No.
3,495,660.

[54] AROMATICITY INFLUENCING THE THERMOSTABILITY OF MICELLAR DISPERSIONS
15 Claims, 1 Drawing Fig.
[52] U.S. Cl. .................................................. 166/252,
166/275
[51] Int. Cl. ...................................................... E21b 43/22
[50] Field of Search .......................................... 166/275,
274, 273, 252; 252/8.55 (D), 309

[56] References Cited
UNITED STATES PATENTS
2,041,275  6/1962  Lummus et al. ............... 252/309X
3,234,143  2/1966  Waldmann .................... 252/309
3,244,638  4/1966  Foley et al. .................... 252/8.5X
3,297,084  1/1967  Gogarty et al. ................ 166/274X
3,330,343  7/1967  Tosch et al. .................. 166/274X
3,348,611  10/1967  Reisberg ...................... 166/274X
3,373,809  3/1968  Cooke .......................... 166/274X
3,495,660  2/1970  Davis et al. ................... 166/275X Primary Examiner—Stephen J. Novosad
Attorneys—Joseph C. Herring, Richard C. Willson, Jr. and Jack L. Hummel ABSTRACT: An improved process of recovering hydrocarbon from a hydrocarbon-bearing subterranean formation wherein a micellar dispersion comprised a hydrocarbon, surfactant and aqueous medium is injected into and displaced through the formation to recover hydrocarbon through a production means, the improvement comprising determining the temperature of the formation, mixing with the surfactant and aqueous medium a hydrocarbon having sufficient aromaticity to obtain a stable micellar dispersion at the temperature of the formation. The micellar dispersion can optionally contain cosurfactant and/or electrolyte. Such a process is especially useful to recover crude oil in a secondary or tertiary oil recovery process wherein the formation is at a temperature in excess of ambient temperature.

THERMOSTABILITY OF MICELLAR DISPERSION

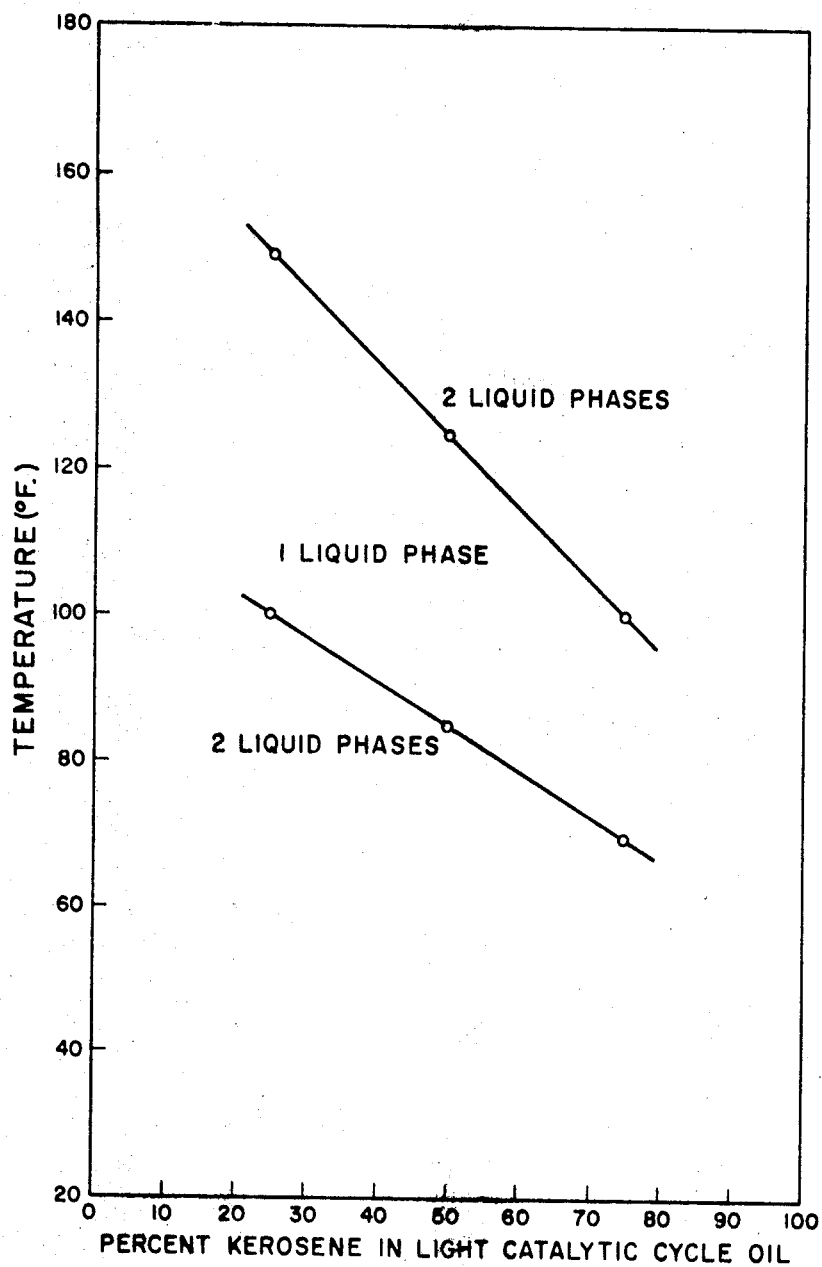
THERMOSTABILITY OF MICELLAR DISPERSION
INVENTORS
JOHN A. DAVIS, JR.
WILLIAM J. KUNZMAN
BY:
ATTORNEY

AROMATICITY INFLUENCING THE THERMOSTABILITY OF MICELLAR DISPERSIONS

CROSS REFERENCE TO RELATED APPLICATION

This is a continuation-in-part of copending U.S. Pat. application identified as Ser. No. 746,391, filed July 22, 1968, now U.S. Pat. No. 3,495,660.

BACKGROUND OF THE INVENTION

Micellar dispersions are useful as miscible-type displacement agents to recover crude oil from subterranean formations. The method of recovery is accomplished by injecting the micellar dispersion into an injection well in fluid communication via the subterranean formation with a producing well and displacing the micellar dispersion through the formation, crude oil is recovered through the producing well. Examples of processes using micellar dispersions are taught in U.S. Pat. Nos. 3,254,714 to Gogarty et al.; 3,275,075 to Gogarty et al.; 3,266,570 to Gogarty; and 3,297,084 to Gogarty et al.

Due to the depth and conditions of the reservoir, the reservoir temperature can vary from below about ambient temperature to about 250° F. or more. Generally, the normal subsurface temperature gradient is about 1° F. per 60 feet.

Applicants have discovered that by choosing a hydrocarbon having a high aromaticity and using it to obtain the micellar dispersion, the thermostability range of the micellar dispersion can be increased to higher temperatures. The micellar dispersion may be unstable at a lower temperature range with the higher aromaticity hydrocarbon. The term "thermostability" as used herein means thermodynamically stable, i.e. a system below or above the thermostability temperature range will exhibit two or more distinct layers or phases, indicating an unstable system or an emulsion.

DESCRIPTION OF THE DRAWING

The drawing illustrates the thermostability of a micellar dispersion dependent on the aromaticity of the hydrocarbon. This micellar dispersion is composed of 57.3 percent hydrocarbon, 30 percent water, 10.9 percent sulfonate (average molecular weight of about 470, about 62 percent active sulfonate), 1.8 percent isopropanol and 2.0 percent sodium sulfate by weight (based on active sulfonate). The hydrocarbon component of the micellar dispersion is composed of kerosene and light catalytic cycle oil; the percents of each are indicated on the horizontal axis within the drawing. The light catalytic cycle oil has an aromatic content of about 65 percent wherein the kerosene has an aromatic content of about 15 percent. The drawing illustrates, for example, that a hydrocarbon composition of 75 percent kerosene and 25 percent light catalytic cycle oil has a thermostability range of 70°–101° F. That is, within this temperature range a single phase region is characteristic. Whenever the aromaticity of the hydrocarbon is increased to 75 percent light catalytic cycle oil and 25 percent kerosene, the thermostability range of the micellar dispersion is increased to 100°–150° F. Whenever a 50–50 mixture of the kerosene and light catalytic cycle oil is used in the micellar dispersion, the thermostability range of the dispersion is between the above two temperature ranges, i.e. 85°–125° F.

DESCRIPTION OF THE INVENTION

The term "micellar dispersion" as used herein is meant to include micellar solutions, "microemulsions" [Schulman and Montagne, Annals of the New York Academy of Sciences, 92, pages 366—371 (1961)], "transparent" emulsions (Blair, Jr. et al., U.S. Pat. No. 2,356,205) and micellar dispersion technology taught by C. G. Summer, Clayton's, The Theory of Emulsions and Their Technical Treatment, 5th Edition, pp. 315—320 (1954). Micellar dispersions differ from emulsions in many ways, the strongest differentiation being that the former are thermodynamically stable whereas the latter are not.

The micellar dispersion is composed of hydrocarbon, aqueous medium, and surfactant sufficient to impart micellar characteristics to the dispersion. Optionally, cosurfactant and/or electrolyte can be incorporated into the dispersion. Examples of volume amounts include from about 4 percent to about 60 percent or more of hydrocarbon, from about 20 percent to about 90 percent aqueous medium, at least about 4 percent surfactant, from about 0.01 to about 20 percent or more of cosurfactant (also identified as semipolar organic compound and as cosolubilizer) and up to about 5 percent or more by weight (based on the aqueous medium) of electrolyte. In addition, the dispersion can contain other additives such as corrosion and scale inhibitors, bactericides, etc. The micellar dispersions can be oil external or water external. Both are useful in the recovery of crude oil.

Examples of hydrocarbon include crude oil (both sweet and sour), partially refined fractions thereof and refined fractions of crude oil. Specific examples include side cuts from crude columns, crude column overheads, gas oils, kerosene, heavy naphthas, naphthas, straight run gasoline, and liquefied petroleum gases. Pure hydrocarbons are also useful, e.g. paraffin compounds including propane, pentane, heptane, decane, dodecane, etc.; cycloparaffin compounds including cyclohexane, etc.; aryl compounds including benzene, naphthalene, anthracene, etc.; alkylated products thereof including toluene, alkyl phenols, etc. Examples of preferred aromatic hydrocarbons include product streams from catalytic reformers and preferred cuts of said streams; catalytic cracked hydrocarbon streams such as gasoline LCCO (light catalytic cycle oil), etc.; thermally cracked distillates such as coker distillate, etc.; and hydrocarbons such as benzene, toluene, xylene, cumene, naphthalene, etc. Alkylated aryl compounds are especially useful as the aromatic hydrocarbon. The unsulfonated hydrocarbon (e.g. heavy vacuum gas oils and especially aromatic feed stocks) in petroleum sulfonates is also useful.

The aqueous medium can be soft, brackish, or a brine. Preferably, the water is soft but it can contain small amounts of salts which are compatible with the ions in the subterranean formation being flooded.

Surfactants useful with the dispersions include nonionic, cationic, and anionic surfactants. Examples of surfactants include those taught in U.S. Pat. No. 3,254,714 to Gogarty et al. Other useful surfactants include Duponol WAQE (a 30 percent active sodium lauryl sulfate marketed by DuPont Chemical Corporation, Wilmington, Del.), Energetic W–100 (a polyoxyethylene alkyl phenol marketed by Armour Chemical Company, Chicago, Ill., Triton X–100 (an alkylphenoxy polyethoxy ethanol marketed by Rohm & Haas, Philadelphia, Pa.) and Arquad 12–50 (a 50 percent active dodecyl trimethyl ammonium chloride marketed by Armour Chemical Company, Chicago, Ill.), and like materials.

Petroleum sulfonates are the preferred surfactants useful with the micellar dispersion. They are also known as alkyl aryl naphthenic sulfonates. Such can be obtained by sulfonating at least a portion of a sulfonatable hydrocarbon (e.g. gas oils) and then neutralizing the mixture, e.g. with $NH_4OH$, NaOH, etc. The sulfonate can contain, e.g. after extraction, above about 60 to about 100 percent active sulfonate. Examples of preferred surfactants are the sodium and ammonium petroleum sulfonates having an average equivalent weight of from about 360 to about 520, and more preferably from about 400 to about 470. The sulfonate can be a mixture of low and high average equivalent weights. Surfactants of like character are also useful. Also, mixtures of surfactants of differing character are useful.

Examples of cosurfactants include aldehydes, ketones, esters, amino compounds, and alcohols containing from one up to about 20 or more carbon atoms. Preferably, the cosurfactant is an alcohol, e.g. ethanol, isopropanol, n- and isobutanol, the amyl alcohols, 1- and 2-hexanol 1- and 2-octanol decyl alcohols, p-nonyl phenol, and alcoholic liquors such as fusel oils. Two or more cosurfactants are useful.

Electrolytes useful in the dispersion include inorganic bases, inorganic acids, inorganic salts, organic bases, organic acids, and organic salts. Examples of electrolytes include those found in U.S. Pat. Nos. 3,297,084, and 3,330,343. Preferably, the electrolytes are inorganic acids, inorganic bases, and inorganic salts. Examples of preferable electrolytes include sodium sulfate, sodium chloride, sodium hydroxide, hydrochloric acid, sulfuric acid, and sodium nitrate.

As mentioned previously, increasing the aromatic content of the hydrocarbon shifts the thermostability of the micellar dispersion to higher temperatures. By this teaching, reservoir temperatures exceeding ambient temperatures will not adversely influence the stability of the micellar dispersions. That is, the micellar dispersion can be designed to have a thermostability range within the temperature range of the reservoir rock.

The lowest thermostability range of a dispersion of this invention would be one composed of a hydrocarbon having relatively no aromatic content whereas the highest thermostability range of the micellar dispersion would be one composed of a very highly aromatic hydrocarbon. It is recognized that the particular surfactant, cosurfactant, and electrolyte will be designed to be compatible with hydrocarbon, reservoir fluids and reservoir rock to obtain a micellar dispersion having desired characteristics. That is to say that the other components within the micellar dispersion will be designed to be compatible with the overall requirements of the particular hydrocarbon and the processing conditions within the flooding operation.

Preferably, the micellar dispersion has a mobility less than that of the formation fluids (crude oil plus formation water) within the reservoir formation. That is, the mobility of the micellar dispersion is preferably about equal to or less than that of the combined mobility of the crude oil and connate water within the reservoir.

It is not intended that the invention be limited by the specifics taught within the specification and appended claims. Rather, equivalents obvious to those skilled in the art are meant to be incorporated within the scope of the overall invention.

We claim:

1. An improved process of recovering hydrocarbon from a hydrocarbon-bearing subterranean formation wherein a micellar dispersion comprised of hydrocarbon, aqueous medium, and surfactant is injected into the formation through at least one injection means and displaced through the formation toward at least one production means to recover hydrocarbon through the production means, the improved process comprising determining the temperature of the formation, mixing with the aqueous medium and surfactant a hydrocarbon having an aromaticity sufficient to obtain a stable micellar dispersion at the temperature of the formation and injecting this dispersion into the formation.

2. The process of claim 1 wherein the temperature of the formation is in excess of about 80° F.

3. The process of claim 1 wherein the temperature of the formation is in excess of about 150° F.

4. The process of claim 1 wherein the temperature of the formation is in excess of about 200° F.

5. The process of claim 1 wherein the micellar dispersion contains cosurfactant

6. The process of claim 1 wherein the micellar dispersion contains electrolyte.

7. The process of claim 1 wherein the surfactant is a petroleum sulfonate.

8. A method of increasing the thermostability range of a micellar dispersion comprised of hydrocarbon, aqueous medium, and surfactant to higher temperature ranges, the method comprising mixing with the aqueous medium and surfactant a hydrocarbon having an aromaticity sufficient to obtain a stable micellar dispersion at a higher temperature.

9. The method of claim 8 wherein the micellar dispersion contains cosurfactant.

10. The method of claim 9 wherein the cosurfactant is alcohol containing from one to about 20 carbon atoms.

11. The method of claim 8 wherein the surfactant is a petroleum sulfonate having an average equivalent weight within the range of from about 360 to about 520.

12. The method of claim 8 wherein the micellar dispersion is stable at temperatures in excess of about 80° F.

13. The method of claim 8 wherein the micellar dispersion is stable at temperatures in excess of about 50° F.

14. The process of claim 8 wherein the micellar dispersion is stable at temperatures in excess of about 200° F.

15. The method of claim 8 wherein the micellar dispersion contains electrolyte.

PO-1050
(5/69)

UNITED STATES PATENT OFFICE
CERTIFICATE OF CORRECTION

Patent No. __3,578,082__  Dated __May 11, 1971__

Inventor(s) __John A. Davis, Jr. et al__

It is certified that error appears in the above-identified patent and that said Letters Patent are hereby corrected as shown below:

Col. 2, line 29: Delete "catalytic" and insert --catalytically--.

Col. 4, line 3: Delete "through the formation".

Col. 4, line 9: After "formation" insert --, said aromaticity being relatively low at low formation temperature and progressively greater at increasingly higher formation temperature,--.

Col. 4, line 28: After "temperature" insert --, said aromaticity being relatively low at low temperature ranges and progressively greater at increasingly higher temperature ranges.--.

Signed and sealed this 7th day of March 1972.

(SEAL)
Attest:

EDWARD M. FLETCHER, JR.
Attesting Officer

ROBERT GOTTSCHALK
Commissioner of Patents